United States Patent Office 2,822,347
Patented Feb. 4, 1958

2,822,347

METHOD OF PREPARING TRIAZINYL COMPOSITIONS AND PRODUCTS THEREOF

Henry P. Wohnsiedler, Darien, Conn., assignor to American Cyanamid Company, New York, N. Y., a corporation of Maine No Drawing. Application June 3, 1955
Serial No. 513,147

19 Claims. (Cl. 260—67.6)

This invention relates to the production of new synthetic materials which are especially useful in the plastics, coating, adhesive, laminating, molding, textile-treating, paper-treating, paper-additive and other arts. More particularly, the invention is concerned with a method of preparing certain aldehyde-reactable aminotriazine reaction products (triazinyl compositions) and with the reaction of the aforesaid aldehyde-reactable products with an aldehyde; and with the products thereof.

In practicing my invention an aldehyde-reactable triazinyl composition is prepared by effecting reaction under heat between ingredients comprising (1) a 1,3,5-triazine containing at least two aldehyde-reactable amino groups (e. g., melamine, N-phenylmelamine, formoguanamine, ammeline, etc.), (2) a halohydrin (e. g., ethylene chlorohydrin, ethylene bromohydrin, propylene chlorohydrin, etc.) and (3) a tertiary amine and more particularly a tertiary hydrocarbon amine (e. g., pyridine, triethyl amine, tripropyl amine, etc.), that is, a tertiary amine wherein the substituents attached to the amino nitrogen are hydrocarbon substituents. The 1,3,5-triazine of (1) has attached to one carbon atom of the triazine nucleus a grouping which contains an —NH$_2$ radical and has attached to another carbon atom of the triazine nucleus a grouping which contains an —NHR radical, where R represents a member of the class consisting of hydrogen and monovalent hydrocarbon radicals. The ingredients of (1) and (3) are employed in a molar ratio of from 0.5 to 3 moles (more particularly from 1 to 2 or 3 moles) of the latter for each mole of the former, and the halohydrin of (2) is employed in a molar ratio at least equal to that of the tertiary amine of (3), more particularly from 1 to 2 moles of the halohydrin for each mole of the tertiary amine.

A cationic aminoplast is obtained by reacting ingredients comprising (1) an aldehyde, including polymeric aldehydes, hydroxy-aldehydes and aldehyde-addition products, e. g., formaldehyde, paraformaldehyde, glycolic aldehyde, dimethylol urea, etc., and (2) an aldehyde-reactable aminotriazine produced by inter-reaction of the aforementioned 1,3,5-aminotriazine, halohydrin and tertiary amine. Solutions of this cationic aminoplast are nearly neutral and are substantive toward various natural and synthetic fibers, e. g., natural cellulosic fibers and fibers of regenerated cellulose, including the various rayons, wool, silk and other proteinaceous fibers. Hence they are particularly useful as textile-treating compositions, paper-treating compositions, beater additives in the production of paper, or as components of such compositions.

Aminoplasts, including cationic aminoplasts, of various kinds were known prior to my invention. See, for instance, Wohnsiedler and Thomas U. S. Patents 2,345,543 and 2,356,718, which are directed to colloidal aqueous solutions of certain partially polymerized, positively charged aminotriazine-formaldehyde condensation products; and West U. S. Patent No. 2,433,802, which discloses quaternary ammonium and quaternary pyridinium salts of an uncured melamine-formaldehyde reaction product, more particularly a methylol melamine or an alkylated methylol melamine. Such salts contain the grouping —NH—CH$_2$—N(tert.)·Y, where Y represents an anion of an acid that forms a salt with a tertiary nitrogen base. They are relatively unstable in solution and decompose upon heating with liberation of the tertiary amine salt and the formation of resinous melamine-formaldehyde condensation products.

The method of this invention provides cationic aminoplasts which have properties different from those previously known in the art, e. g., in such properties as solubility characteristics, stability on storage, substantivity toward materials to which they are applied, etc. They are made from relatively inexpensive raw materials without processing difficulties, and find utility in applications where the current cationic aminotriazine-aldehyde condensation products and solutions thereof would be entirely unsuited. The advantages of the invention will, therefore, be readily apparent to those skilled in the art.

The following examples are given by way of illustration and not by way of limitation so that those skilled in the art may better understand how the present invention can be carried into effect. All parts and percentages are by weight.

Example 1

|  | Parts | Approximate Molar Ratio |
|---|---|---|
| Melamine | 126 | 1 |
| Ethylene chlorohydrin | 240 | 3 |
| Pyridine | 237 | 3 |

The above ingredients are heated together with stirring in a reaction vessel provided with a stirrer and reflux condenser, being brought to refluxing temperature (125° C.) in 12 minutes. After heating and stirring for an additional 28 minutes under reflux, the mixture crystallizes to an almost solid mass. The reaction vessel is transferred to an oil bath, and the mass is raised to a temperature of 160° C. in 65 minutes. After heating for another 15 minutes to 172° C., the reaction mass is almost clear and deep amber in color. Heating is continued for an additional 25 minutes to 180° C., after which the product is cooled slightly and poured into a stainless steel tray wherein it crystallizes upon further cooling. The crystalline product is slightly gummy, largely insoluble in ethanol, but is readily broken up by trituration. It is mortar-ground with ethanol through a 20-mesh screen onto a Büchner funnel, and the cake washed three times with a total of about 800 parts of ethanol. The washed product is dried at 60° C., yielding 329 parts of dried product. The product is not a pure compound (that is, a single entity) but is probably a mixture of compounds of which those represented by the following formulas are possibilities:

(I)

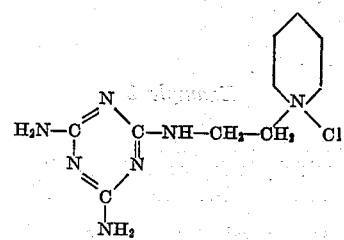

Theoretical total nitrogen=36.66%
Theoretical chlorine=13.25%

(II)

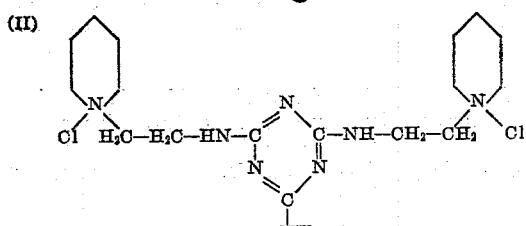

Theoretical total nitrogen=27.40%
Theoretical chlorine=17.34%

(III)

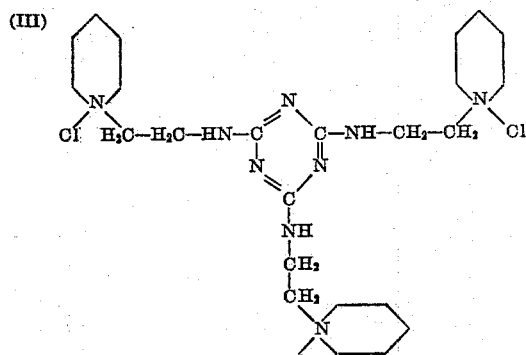

Theoretical total nitrogen=22.91%
Theoretical chlorine=19.32%

(IV)

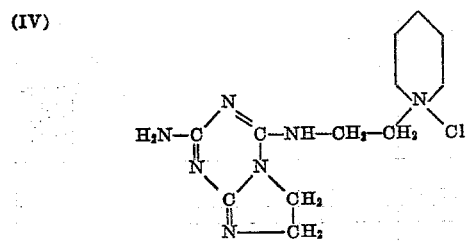

Theoretical total nitrogen=33.38%
Theoretical chlorine=12.10%

(V)

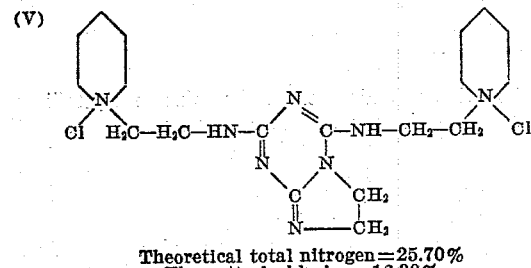

Theoretical total nitrogen=25.70%
Theoretical chlorine=16.30%

The following are the results of analysis of the product of this example for carbon and nitrogen:

| | Percent N | Percent Cl |
|---|---|---|
| Found | 26.27 | 15.24 |
| Theoretical for $C_{19}H_{34}N_8Cl_2$ (compound of Formula V) | 25.70 | 16.30 |

Assuming the product to have an average composition corresponding most nearly to that of the compound of Formula V, or that it is composed mainly of said compound, the yield thereof (based on the amount of starting melamine employed) is about 81% of the theoretical.

*Example 2*

| | Parts |
|---|---|
| Reaction product of Example 1 | 204.0 |
| Aqueous formaldehyde (approx. 37.1% HCHO) | 80.5 |
| Water | 30.0 |

The above amount of water provides 75% solids in the mixture. The mixture of the foregoing ingredients is heated to 80-85° C., forming a slightly viscous, amber-colored, slightly hydrophobic, syrupy reaction product having a pH value of 6.6.

A sample of the syrupy product is cast to yield a film, which after baking for 5 hours at 65° C. is clear and hard. Similarly cast films are clear and horny after baking for 1¾ hours at 65° C. or for 1 hour at 120° C. The baked films are alkali-resistant and are not attacked by heating in water to the boiling point.

*Example 3*

40 parts of the syrupy reaction product of Example 2 are diluted with 246 parts of water to yield a solution containing 3.5% solids. Viscose rayon fibers are immersed in this solution and then dried by heating at 65-75° C. for several hours in order to insolubilize the resin. The resulting fibers are unaffected by boiling water.

*Example 4*

(A) Same as in Example 2 with the exception that 650 parts of water instead of 30 parts are employed, thereby to obtain a reaction mass containing about 25% by weight of solids. The mixture of starting reactants is heated to 70-75° C., at which temperature solution occurs. This solution is hydrophilic. A sample of the resulting solution is cast as a film, which is then baked for 1 hour at 120° C. A hard film is obtained that swells somewhat on contact with water.

(B) In another similar test, using the same proportions of reactants, the pH is adjusted from 6.0 to 7.1 with sodium hydroxide, thereby stabilizing the solution.

The solution of (B) above is raised to a pH of 11.2. A sample of the solution is cast as a film, which is then baked for 1¼ hours at 120° C. The baked film is non-hardenable.

*Example 5*

| | Parts | Approx. Molar Ratio |
|---|---|---|
| Melamine | 126 | 1 |
| Ethylene chlorohydrin | 161 | 2 |
| Pyridine | 79 | 1 |

The above ingredients are heated together with stirring in a reaction vessel equipped as in Example 1, and the reaction mixture is brought to reflux temperature in 20 minutes. After heating and stirring for an additional 30 minutes, the reaction vessel is transferred to an oil bath and the mass is raised to a temperature of 210° C. in 45 minutes. Heating is continued at 210° C. over a period of 60 minutes, after which the product is discharged from the reaction vessel and further processed in essentially the same manner described under Example 1.

The reaction product of this example is reactable with an aldehyde, e. g., formaldehyde, as described under Example 2. The aldehyde-reaction products are useful in such applications as have been mentioned hereinbefore, for instance in such specific applications as those set forth under Examples 2, 3 and 4.

*Example 6*

| | Parts | Approx. Molar Ratio |
|---|---|---|
| Melamine | 252 | 1 |
| Ethylene chlorohydrin | 161 | 1 |
| Pyridine | 158 | 1 | are reacted together to form an aldehyde-reactable triazinyl composition in essentially the same manner described under Example 5.

One hundred (100) parts of the dried material, 145 parts of aqueous formaldehyde (approx. 37.1% HCHO) and 260 parts of water are heated together to 75° C., and held at this temperature for several minutes. A hydrophilic solution of a cationic reaction product of formaldehyde with the melamine-ethylene chlorohydrin-pyridine reaction product of this example is obtained. It can be concentrated and used as a textile-treating agent, paper-treating agent, beater additive for use in making paper, alone or admixed with other agents conventionally employed in such compositions.

*Example 7*

Example 1 is repeated with the exception that, in addition to the melamine, ethylene chlorohydrin and pyridine, there is also added to the reaction vessel 210 parts of monobutyl ether of ethylene glycol as a diluent in which the reaction is effected. The reaction is continued at the reflux temperature of the mass for about 2 hours after refluxing has started, and part of the diluent is removed by vacuum distillation while the temperature is further raised over an additional 30 minutes. The residue is solid when cold. After heating to 165° C. and decanting the excess liquid diluent, the product is a soft, gummy material. It is mulled in a mortar with 1500 parts of alcohol and passed through a 20-mesh screen onto a Büchner funnel. After filtering and washing with alcohol, the cake is dried at 65° C. The product thereby obtained is useful as a resin-forming reactant with an aldehyde, e. g., formaldehyde, acetaldehyde, butyraldehyde, acrolein, methacrolein, paraformaldehyde, etc., under neutral, alkaline or acid conditions, and in molar ratios of, for instance, from about 1 to 4 moles of the latter per mole of the former and at temperatures ranging from about 30° or 40° C. up to the reflux temperature of the reaction mass at atmospheric pressure.

Instead of using monobutyl ether of ethylene glycol as a diluent in the above example, other diluents or inert media in which the reaction is effected can be employed, e. g., o-dichlorobenzene.

*Example 8*

Example 1 is repeated with the exception that 283.5 parts of propylene chlorohydrin (1-chloro-2-propanol) is used instead of 240 parts of ethylene chlorohydrin. Similar results are obtained.

*Example 9*

Example 1 is repeated with the exception that 375 parts of ethylene bromohydrin is employed instead of 240 parts of ethylene chlorohydrin. Similar results are obtained.

*Example 10*

Same as in Example 1 with the exception that 279 parts of picoline, more particularly a mixture of isomeric picolines (2-, 3- and 4-picolines, which also are known as 2-, 3- and 4-methylpyridines), is used instead of 237 parts of pyridine. Similar results are obtained.

*Example 11*

Essentially the same procedure is followed as in Example 1 with the exception the 202 parts of N-phenylmelamine is substituted for 126 parts of melamine. Similar results are obtained.

*Example 12*

Two hundred and four (204) parts of a triazinyl composition produced as described under Example 1 and 122 parts of a 37% aqueous formaldehyde solution are heated to 82° C. After about 30 seconds at this temperature the mixture first becomes clear and then gels. It is broken up and baked at 120° C. for 1½ hours. The dried material is in the form of a hard, amber-colored resin. When tested as an anion-exchange resin, a capacity of 10 kilograins (CaCO₃) per cu. ft. is found.

*Example 13*

|  | Parts | Approx. Molar Ratio |
|---|---|---|
| Melamine | 126 | 1 |
| Glycerol alpha-chlorohydrin | 111 | 1 |
| Pyridine | 79 | 1 | are heated together at 140°–145° C. for 2 hours, until reflux subsides, followed by heating at 170° C. for 2¼ hours. At the end of this period the reaction mass is a deep-brown, viscous liquid which, on cooling to room temperature, becomes a soft wax. It can be purified, if desired, to remove unreacted ingredients; or the crude product itself, which is aldehyde-reactable, can be reacted with formaldehyde or other aldehydes, or compounds engendering an aldehyde or containing an active carbonyl group, to yield a wide variety of resinous materials.

*Example 14*

|  | Parts | Approx. Molar Ratio |
|---|---|---|
| Benzoguanamine | 187 | 1 |
| Glycerol alpha-chlorohydrin | 111 | 1 |
| Pyridine | 79 | 1 |

Essentially the same procedure is followed as described under Example 13 to obtain an aldehyde-reactable reaction product of the aforesaid ingredients. About 17 parts of this reaction product, 1.5 parts of paraformaldehyde and 60 parts of ethanol are mixed and heated together at 80° C. for 1½ hours to yield a resin solution of the reaction product of paraformaldehyde with the benzoguanamine-glycerol alpha-chlorohydrin-pyridine reaction product. This resin solution is suitable for use as a textile-treating composition, paper-treating composition, as a beater-additive in the production of paper, as an impregnating composition, and for various other purposes. Instead of ethanol as a solvent for the resin, any other solvent or diluent for the resin obviously can be employed.

*Example 15*

|  | Parts | Approx. Molar Ratio |
|---|---|---|
| Melamine | 126 | 1 |
| Ethylene chlorohydrin | 80 | 1 |
| Triethyl amine | 101 | 1 | are heated together with stirring at the reflux temperature (100°–105° C.) for 3 hours, after which the temperature is raised and heating is continued at 205°–210° C. for 2½ hours. The fluid reaction product is extracted with water at 75° C., and the insolubles (largely unreacted melamine) removed by filtration. The solution of the malamine-ethylene chlorohydrin-triethyl amine reaction product is evaporated to dryness to yield a solid, aldehyde-reactable triazinyl composition, which can be further purified, if desired, or can be reacted directly with formaldehyde or other aldehyde to form a resinous composition.

*Example 16*

Essentially the same procedure is followed as described under Example 15 with the exception that 143 parts of tripropyl amine is used in place of 101 parts of triethyl amine. Similar results are obtained.

It will be understood, of course, by those skilled in the art that my invention is not limited to the specific reactants nor to the specific conditions of reaction shown in the above illustrative examples. Thus, the temperatures of the reaction at which the aldehyde-reactable aminotriazine reactant and the aldehyde-reaction product thereof are formed can be varied over a wide range, as desired or as conditions may require. Advantageously the aldehyde-reactable aminotriazine reactant is prepared by heating the required reactants in the manner illustrated in the foregoing examples, but higher or lower temperatures may be employed. Thus, one can use temperatures as low as, for instance, 100° or 110° C. up to, for example, 225°–240° C., depending upon the particular reactants employed and other influencing factors. The aldehyde-reaction products may be produced by co-reaction at temperatures ranging, for instance, from room temperature (20°–30° C.) up to the fusion or boiling temperature of the mixed reactants.

Another method of effecting the reaction between the primary reactants used in producing the triazinyl composition is to first react the tertiary amine, e. g., pyridine, with the halohydrin, e. g., ethylene chlorohydrin. This initial reaction product is then caused to react with the 1,3,5-triazine containing at least two aldehyde-reactable amino groups. For instance, the reaction of pyridine and ethylene chlorohydrin yields the crystalline product having the formula (V-A)

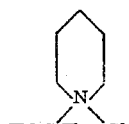

M. P. 120° C.

and this product then can be reacted with melamine to yield a triazinyl composition similar to that of Example 1.

Illustrative examples of tertiary amines (including tertiary hydrocarbon amines) that can be used in producing the aldehyde-reactable aminotriazines of this invention, and which can be employed in lieu of all or part of the particular tertiary amine used in the individual example, are: trialkyl amines, especially those containing from 2 to 10 carbon atoms, inclusive, in each alkyl grouping thereof; triaryl amines, e. g., triphenyl amine; triaralkyl amines, e. g., tribenzyl amine; trialkaryl amines, e. g., tritolyl amine; tricycloalkyl amines, e. g., tricyclohexyl amine; the N-alkyl (e. g., N-methyl, -ethyl, -propyl, -butyl, etc.) morpholines and thiamorpholines; quinoline; and the like. If the tertiary amine is normally a gas, as is trimethyl amine for example, the reaction is carried out under superatmospheric pressure. The preferred tertiary amines employed are those boiling at atmospheric pressure within the range of about 90°–100° C. to about 235°–250° C.

Illustrative examples of halohydrins (monochloro-, monobromo-, monoiodo- and monofluorohydrins) that can be employed in preparing the aldehyde-reactable aminotriazines of this invention, and which can be used in lieu of all or part of the particular halohydrin employed in the individual example, are:

3-chloro-1-propanol (trimethylene chlorohydrin)
3-bromo-1-propanol
1-chloro-2-methylpropanol
Ethylene fluorohydrin
2-chloro-4-pentanol
2-bromo-4-pentanol
2-chloro-3-hexanol
2-bromo-3-hexanol
3-chloro-4-heptanol
3-bromo-4-heptanol
5-chloro-4-octanol
5-bromo-4-octanol
3-chloro-3-methyl-2-butanol
2-chloro-2-methyl-1-butanol
3-chloro-2-methyl-1-pentanol
2-chloro-2-methyl-3-hexanol
3-chloro-3-methyl-4-heptanol
3-chloro-2-methyl-4-heptanol
Glycerol alpha-bromohydrin (3-bromo-1,2-propanediol)
2-chloro-1,3-propanediol
2-chloro-2-methylol-1-butanol (2-ethyl-2-chloro-1,3-propandiol)
3-bromo-1,2-butanediol
3-chloro-1,2-butanediol
2-chloro-1,4-pentanediol
3-bromo-1,5-pentanediol The use of available iodohalohydrins, for instance those corresponding to the above chloro-, bromo- and fluorohydrins is not precluded, but have the disadvantage that they impart color to the resulting aminotriazine.

Illustrative examples of aminotriazine starting reactants that can be employed (that is, 1,3,5-triazines having attached to one carbon atom of the triazine nucleus a grouping which contains an —NH₂ radical and having attached to another carbon atom of the triazine nucleus a grouping which contains an —NHR radical) are those represented by the formula (VI)

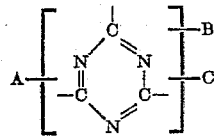

where A represents a grouping which contains an —NH₂ radical, e. g., —NH₂ itself, —CONH₂ (carbamyl), thiocarbamyl (—CSNH₂), —NHCONH₂ (ureido), —NHCSNH₂ (thioureido), —NHNHCONH₂ (semicarbazido), —NHNHCSNH₂ (thiosemicarbazido), —NHNH₂ (hydrazino), etc.; B represents a grouping which contains an —NHR radical, where R represents hydrogen or a monovalent hydrocarbon radical; and C represents hydrogen, hydroxy, halogen (e. g., chlorine, bromine, etc.), any organic (carbon-containing) substituent including cyano, hydrocarbon, and hydroxyhydrocarbon radicals, or any of the groupings represented by A and B.

Illustrative examples of monovalent hydrocarbon radicals represented by R in the aforementioned —NHR radical, and which C also may represent, are: aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butyl-phenyl, etc.); and aryl-substituted aliphatic (e. g., benzyl, cinnamyl, phenylethyl, tolylethyl, phenylpropyl, etc.).

Illustrative examples of hydroxyhydrocarbon radicals which C in Formula VI may represent are hydroxyhydrocarbon radicals corresponding to those hydrocarbon radicals just named by way of illustration with respect to R in the aforementioned —NHR radical, e. g., hydroxyethyl, hydroxypropyl, hydroxyisopropyl, dihydroxypropyl, hydroxybutyl, etc.

Illustrative examples of grouping represented by B in Formula VI are —NHR itself, —CONHR, —CSNHR, —NHCONHR, —NHCSNHR, —NHNHCONHR, —NHNHCSNHR, —NHNHR, etc., where R has the same meaning as given above.

One can use an aminotriazine represented by Formula VI in lieu of all or part of the aminotriazine starting reactant employed in the individual examples.

In producing the reaction product of an aldehyde with the aldehyde-reactable aminotriazine, the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that can be employed, e. g., an equivalent amount thereof in place of formaldehyde in the foregoing examples, are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycolic aldehyde, glyceraldehyde, etc.), mixtures thereof, or mixtures of formaldehyde (of compounds engendering formaldehyde) with such aldehydes.

The ratio of the aldehydic reactant to the aldehyde-reactable aminotriazine can be varied over a wide range depending, for example, upon the number of aldehyde-reactable amino groups in the aminotriazine and upon the particular properties desired in the finished product. The aldehyde, e. g., formaldehyde, is used in an amount sufficient to react with from one to all of the reactive amino groups in the aminotriazine. Thus, one can use, for instance, from 1 to 6 moles (or more if desired), preferably from 1 to 2 or 3 moles, of the aldehyde per mole of the aminotriazine.

The initial condensation reaction between the aldehyde, specifically formaldehyde, and the aldehyde-reactable aminotriazine, may be carried out at normal or at elevated temperatures, at atmospheric, subatmospheric or superatmospheric pressures, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or triamine, aqueous ammonia, etc. Illustrative examples of acid condensation catalysts that may be employed are inorganic and organic acids, e. g., hydrochloric, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and acid salts may be employed if desired.

The reaction between the aldehyde, e. g., formaldehyde, and the aldehyde-reactable aminotriazine may be carried out in the presence of solvents or diluents, other natural or synthetic bodies (numerous examples of which hereafter are given), or while admixed with other materials which are reactable or non-reactable with the aldehydic reactant or with the triazine derivative, e. g., urea, thiourea, cyanamide, dicyandiamide, succinamide, phthalic diamide, acetamide, chlorinated acetamides, etc.; ketones, e. g., methyl ethyl ketone, methyl vinyl ketone, acetone, etc.; aldehyde-reactable triazinyl compounds other than the triazine derivatives used in practicing the present invention, e. g., melamine, ammeline, ammelide, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, polyallyl alcohol, etc.; amines, including propyl amine, dibutyl amine, aniline, etc.; and others.

The modifying reactants may be incorporated with the aminotriazine and the aldehyde to form an intercondensation product by mixing all the reactants and effecting condensation therebetween under acid, alkaline or neutral conditions or by various permutations of reactants. For example, I may effect partial reaction or condensation between the chosen aldehyde and the aminotriazine, then add the modifying reactant, e. g., urea, melamine, etc., and effect further condensation. Or, I may first partially react urea, melamine or other aldehyde-reactable modifying reactant with a molecular excess of an aldehyde under acid, alkaline or neutral conditions, then add the aminotriazine, and effect further condensation. Or, I may separately partially react (1) urea, melamine or other aldehyde-reactable modifying reactant and an aldehyde and (2) an aminotriazine of the kind herein described and an aldehyde, thereafter mixing the two products of partial reaction and effecting further reaction or condensation therebetween. The reactants of (1) and (2) initially may be partially condensed under acid, alkaline or neutral conditions.

Some of the aminotriazine-aldehyde reaction products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins that have unsatisfactory physical characteristics. The thermosetting or potentially thermosetting resinous condensation products, alone or mixed with fillers, pigments, dyes, plasticizers, lubricants, curing agents, etc., may be used, for example, in the production of molding compositions. The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. Thus, as has been indicated hereinbefore, they are particularly useful and valuable, because of their cationic nature, as compositions (or as components of compositions) for the treatment of cellulosic and non-cellulosic textiles (e. g., cotton, linen, rayons, silk, wool, Orlon, Dacron, nylon, Vicara, Acrilan, etc.) in continuous filament, thread, staple, yarn, fabric (knitted, woven, felted, etc.) or other form, in order to improve the properties of such textile materials, e. g., to increase the stiffness, to increase the service life, to provide antistatic properties, or otherwise to enhance the properties of the treated materials and to make them more useful or serviceable to the ultimate user.

The curing of the thermosetting or potentially thermosetting resinous compositions of this invention may be accelerated by incorporating therein a curing agent (or mixture of curing agents), for instance, a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phosphoric acid, ammonium chloride, ammonium silicofluoride, ammonium borofluoride, benzoyl mercaptobenzothiazole, ammonium salt of toluene sulfonic acid, phthaloyl mercaptobenzothiazole, benzoyl phthalimide, etc.). Catalysts which are capable of intercondensing with the partial reaction product may be employed, for instance, curing reactants such as glycine, sulfamic acid, chloroacetone, mono-, di- or trichloroacetamides, chloroacetyl urea, etc. The amount of curing agent, if used, may be varied as desired or as conditions may require, but ordinarily is within the range of 0.1 to 5 or 6 percent by weight of the neutral, thermosetting or potentially thermosetting resinous composition.

As indicated hereinbefore, the properties of the fundamental aminotriazine-aldehyde reaction products of this invention may be varied widely by introducing other modifying bodies before, during or after effecting condensation between the primary components. Thus as modifying agents I may use, for instance, monohydric alcohols, e. g., methyl, ethyl, propyl, butyl, hexyl, n-octyl, 2-ethylhexyl, decyl, dodecyl, cetyl, lauryl, capryl, or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, trimethylol propane, mannitol, sorbitol, ethylene glycol, diethylene glycol, butylene glycol, neopentyl glycol, 2-butene-1,4-diol, 2-butyne-1,4-diol, 2-butyloctanediol-1,3, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., stearamide, acrylamide, methacrylamide, benzamide, phthalamide, benzene sulfonamides, toluene sulfonamides, etc.; amines, e. g., ethylene diamine, phenylene diamine, triethylene tetramine, etc.; nitriles, including halogenated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetyl urea, etc.

Illustrative examples of other modifying bodies that may be incorporated into the aminotriazine-aldehyde reaction products of this invention are melamine-aldehyde condensation products (e. g., melamine-formaldehyde condensation products), urea-aldehyde condensation products (e. g., urea-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, urea-melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

In the preparation of the coating compositions of this invention I prefer to interact (1) a triazine derivative of the kind embraced by Formula VI, (2) an aldehyde, specifically formaldehyde, and (3) a monohydric alcohol, more particularly a primary monohydric alcohol. An alkylation reaction takes place, and an ether corresponding to the alkyl radical of the alcohol employed is formed. In such reactions I prefer to use n-butanol, but other primary monohydric alcohols may be employed, e. g., methanol, ethanol, n-propyl alcohol, isobutyl alcohol, etc.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, the thermoplastic resins may be used to improve the plasticity or flow characteristics of thermosetting resins which have insufficient or unsatisfactory plasticity during curing to an insoluble, infusible state, e. g., certain urea-formaldehyde and melamine-formaldehyde resins where better flow during molding is desirable. This improved plasticity permits molding at lower pressures. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, fabrics comprised of nylon, polyacrylonitrile fibers, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, for bonding together abrasive grains in the production of resin-bonded abrasive articles such, for instance, as grindstones, sandpapers, etc., for treating leather in order to improve its appearance and physical properties, and for numerous other purposes.

I claim:

1. The method which comprises effecting reaction at a temperature within the range of from 100° C. to 240° C. between ingredients comprising (1) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, (2) a halohydrin and (3) a substantial excess over a catalytic amount of a tertiary amine wherein the substituents attached to the amino nitrogen are hydrocarbon substituents, the ingredients of (1) and (3) being employed in a molar ratio of from 0.5 to 3 moles of the latter for each mole of the former, and the ingredient of (2) being employed in a molar ratio at least equal to that of the ingredient of (3).

2. An aldehyde-reactable triazinyl composition which is the product of the method of claim 1.

3. A method as in claim 1 wherein the 1,3,5-triazine of (1) is melamine.

4. A method as in claim 1 wherein the halohydrin of (2) is ethylene chlorohydrin.

5. A method as in claim 1 wherein the tertiary amine of (3) is pyridine.

6. A method as in claim 1 wherein the tertiary amine of (3) is triethylamine.

7. The method of preparing a new synthetic composition which comprises (1) effecting reaction at a temperature within the range of from 100° C. to 240° C. between ingredients comprising (a) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, (b) a halohydrin and (c) a substantial excess over a catalytic amount of a tertiary amine wherein the substituents attached to the amino nitrogen are hydrocarbon substituents, the ingredients of (a) and (c) being employed in a molar ratio of from 0.5 to 3 moles of the latter for each mole of the former, and the ingredient of (b) being employed in a molar ratio at least equal to that of the ingredient of (c), and (2) reacting the resulting aldehyde-reactable triazinyl composition with an aldehyde.

8. A new synthetic composition which is the product of the method of claim 7.

9. A method as in claim 7 wherein the aldehyde of (2) is formaldehyde.

10. The method which comprises effecting reaction at a temperature within the range of from 100° C. to 240° C. between ingredients comprising (1) melamine, (2) ethylene chlorohydrin, and (3) a substantial excess over a catalytic amount of a tertiary amine wherein the substituents attached to the amino nitrogen are hydrocarbon substituents, the ingredients of (1) and (3) being employed in a molar ratio of from 1 to 3 moles of the latter per mole of the former, and the ethylene chlorohydrin being employed in a molar ratio of from 1 to 2 moles thereof for each mole of the tertiary amine of (3).

11. A method as in claim 10 wherein the tertiary amine of (3) is pyridine.

12. A method as in claim 10 wherein the tertiary amine of (3) is triethylamine.

13. A method of preparing a new synthetic composition which comprises (1) effecting reaction at a temperature within the range of from 100° C. to 240° C. between ingredients comprising (a) melamine, (b) ethylene chlorohydrin, and (c) a substantial excess over a catalytic amount of a tertiary amine wherein the substituents attached to the amino nitrogen are hydrocarbon substituents, the ingredients of (a) and (c) being employed in a molar ratio of from 1 to 3 moles of the latter per mole of the former, and the ethylene chlorohydrin being employed in a molar ratio of from 1 to 2 moles thereof for each mole of the tertiary amine of (c), and (2) reacting the resulting aldehyde-reactable triazinyl composition with formaldehyde.

14. A method as in claim 13 wherein the tertiary amine of (c) is pyridine.

15. A method as in claim 13 wherein the tertiary amine of (c) is triethylamine.

16. A method of producing an aldehyde-reactable triazinyl composition which comprises (1) effecting reaction at a temperature within the range of from 100° C. to 240° C. between ingredients (a) a tertiary amine, wherein the substituents attached to the amino nitrogen and hydrocarbon substituents, and (b) a halohydrin, the ingredients of (b) being employed in a molar ratio at least equal to that of the ingredient of (a), and (2) reacting the resulting compound with (c) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, the ingredients of (a) and (c) being employed in a molar ratio of from 0.5 to 3 moles of the former for each mole of the latter, and the molar amount of the tertiary amine employed being, with respect to the other reactants, substantially in excess of a catalytic amount.

17. A method as in claim 16 wherein the tertiary amine of (a) is pyridine.

18. A method as in claim 16 wherein the halohydrin of (b) is ethylene chlorohydrin.

19. A method as in claim 16 wherein the 1,3,5-triazine of (c) is melamine.

References Cited in the file of this patent

UNITED STATES PATENTS

| | | |
|---|---|---|
| 2,414,289 | Ericks | Jan. 14, 1947 |
| 2,476,548 | Hechenbleikner | July 19, 1949 |
| 2,559,976 | Lindenfelser | July 10, 1951 |
| 2,563,630 | Wohnsiedler et al. | Aug. 7, 1951 |
| 2,594,452 | Kosmin | Apr. 29, 1952 |
| 2,725,379 | Bernstein et al. | Nov. 29, 1955 |
| 2,785,149 | Wohnsiedler | Mar. 12, 1957 |

FOREIGN PATENTS

| | | |
|---|---|---|
| 634,943 | Great Britain | Mar. 29, 1950 |

U. S. DEPARTMENT OF COMMERCE
PATENT OFFICE

CERTIFICATE OF CORRECTION

Patent No. 2,822,347 February 4, 1958

Henry P. Wohnsiedler

It is hereby certified that error appears in the printed specification of the above numbered patent requiring correction and that the said Letters Patent should read as corrected below.

Column 6, line 58, for "malamine-ethylene" read -- melamine-ethylene --; column 14, line 3, for "and hydrocarbon" read -- are hydrocarbon --; line 4, for "ingredients" read -- ingredient --.

Signed and sealed this 8th day of April 1958.

(SEAL)
Attest:

KARL H. AXLINE
Attesting Officer

ROBERT C. WATSON
Commissioner of Patents